(12) United States Patent
Caridis et al.

(10) Patent No.: US 11,871,756 B2
(45) Date of Patent: Jan. 16, 2024

(54) PROCESS AND SYSTEM FOR THE MANUFACTURE OF VEGETABLE DOUGH

(71) Applicant: Heat and Control, Inc., Hayward, CA (US)

(72) Inventors: Andrew Anthony Caridis, San Carlos, CA (US); Ernesto Isam Arao Toyohara, Zapopan (MX); Jesús Adolfo Sandoval Avila, Coyoacán (MX); Sergio González Granados, Tlaquepaque (MX); Miguel Angel Gómez Angulo, Zapopan (MX); Mario Lorenzana Saucedo, Tlaquepaque (MX); Arturo Lorenzana Guerrero, Zapopan (MX)

(73) Assignee: Heat and Control, Inc., Hayward, CA (US)

( * ) Notice: Subject to any disclaimer, the term of this patent is extended or adjusted under 35 U.S.C. 154(b) by 599 days.

(21) Appl. No.: 16/618,904

(22) PCT Filed: Sep. 14, 2017

(86) PCT No.: PCT/IB2017/055566
§ 371 (c)(1),
(2) Date: Dec. 3, 2019

(87) PCT Pub. No.: WO2018/224871
PCT Pub. Date: Dec. 13, 2018

(65) Prior Publication Data
US 2020/0093142 A1    Mar. 26, 2020

(30) Foreign Application Priority Data
Jun. 5, 2017  (MX) .................. MX/a/2017/007061

(51) Int. Cl.
*A21D 2/36* (2006.01)
*A23L 7/10* (2016.01)
(Continued)

(52) U.S. Cl.
CPC ............. *A21D 2/366* (2013.01); *A21D 2/362* (2013.01); *A21D 8/02* (2013.01); *A21D 10/04* (2013.01);
(Continued)

(58) Field of Classification Search
None
See application file for complete search history.

(56) References Cited

U.S. PATENT DOCUMENTS

| | | | |
|---|---|---|---|
| 3,404,986 | A | 10/1968 | Wimmer et al. |
| 3,730,732 | A | 5/1973 | Rubio |

(Continued)

FOREIGN PATENT DOCUMENTS

| | | |
|---|---|---|
| CL | 402-2002 | 3/2002 |
| CL | 403-2002 | 3/2002 |

(Continued)

OTHER PUBLICATIONS

Office Action dated Dec. 9, 2021 for Colombian Application No. NC2019/0007374, filed Sep. 14, 2017, pp. 1-10 (with machine translation).

(Continued)

*Primary Examiner* — Katherine D Leblanc
(74) *Attorney, Agent, or Firm* — Law Offices of Donald N. MacIntosh Intellectual Innovations Legal Advisors

(57) ABSTRACT

A process and system is provided for the manufacture of vegetable dough using only water as an ingredient of the (Continued)

dough, and for a time interval ranging between 5 minutes and up to 10 minutes, wherein the vegetable is selected from vegetables and grains.

21 Claims, 8 Drawing Sheets

(51) Int. Cl.
  *A21D 13/42* (2017.01)
  *A21D 13/047* (2017.01)
  *A21D 8/02* (2006.01)
  *A21D 10/04* (2006.01)
  *B07C 5/06* (2006.01)

(52) U.S. Cl.
  CPC ........... *A21D 13/047* (2017.01); *A21D 13/42* (2017.01); *A23L 7/10* (2016.08); *B07C 5/06* (2013.01); *A23V 2002/00* (2013.01); *A23V 2300/10* (2013.01); *A23V 2300/38* (2013.01); *B07C 2501/0081* (2013.01)

(56) References Cited

U.S. PATENT DOCUMENTS

| | | | |
|---|---|---|---|
| 4,522,837 | A | 6/1985 | Meinardus |
| 4,594,260 | A | 6/1986 | Vaqueiro et al. |
| 4,778,690 | A | 10/1988 | Sadel, Jr. et al. |
| 4,985,269 | A | 1/1991 | Irvin et al. |
| 5,100,686 | A | 3/1992 | Hunt et al. |
| 5,395,637 | A | 3/1995 | Reec |
| 5,558,886 | A | 9/1996 | Martinez-Bustos et al. |
| 6,025,011 | A | 2/2000 | Wilkinson et al. |
| 6,171,629 | B1 | 1/2001 | Morikawa |
| 6,217,442 | B1 | 4/2001 | Schmidt |
| 6,265,013 | B1 | 7/2001 | Martinez-Montes et al. |
| 6,358,550 | B2 | 3/2002 | Sanchez y de la Camara |
| 6,502,773 | B1 | 1/2003 | Hostettler et al. |
| 6,818,240 | B2 | 11/2004 | Brubacher et al. |
| 7,220,443 | B2 | 5/2007 | Rivero-Jimenez et al. |
| 7,740,895 | B2 | 6/2010 | Eckhoff et al. |
| 8,110,239 | B2 | 2/2012 | Wallens et al. |
| 2003/0198725 | A1* | 10/2003 | Cardenas ............... A21D 13/42 426/549 |
| 2004/0142079 | A1 | 7/2004 | Brubacher et al. |
| 2006/0053764 | A1 | 3/2006 | Gerschwiler et al. |
| 2006/0188638 | A1 | 8/2006 | Joseph et al. |
| 2006/0193964 | A1 | 8/2006 | Eckhoff et al. |
| 2007/0237882 | A1 | 10/2007 | Koechner |
| 2010/0080081 | A1 | 4/2010 | Rubio et al. |
| 2012/0263854 | A1 | 10/2012 | Chedid et al. |
| 2013/0184859 | A1 | 7/2013 | Sell |

FOREIGN PATENT DOCUMENTS

| | | |
|---|---|---|
| CN | 101300988 A | 11/2008 |
| EP | 2293673 A1 | 3/2011 |
| JP | H 3-232470 A | 10/1991 |
| JP | H05-236681 A | 9/1993 |
| JP | H 05-9236861 A | 9/1993 |
| WO | 2016105557 A1 | 6/2016 |

OTHER PUBLICATIONS

Response dated Feb. 17, 2022 to Office Action dated Dec. 9, 2021 for Mexican Application No. MX/a/2017/008385, filed Dec. 24, 2015, pp. 1-15 (with machine translation).
Response dated Mar. 3, 2022 to Office Action dated Dec. 9, 2021 for Colombian Application No. NC2019/0007374, filed Sep. 14, 2017, pp. 1-14 (with machine translation).
Translation of Office Action dated Dec. 9, 2021 for Colombian Application No. NC2019/0007374, filed Sep. 14, 2017, pp. 1-10.
Translation of response dated Feb. 17, 2022 to Office Action dated Dec. 9, 2021 for Mexican Application No. MX/a/2017/008385, filed Dec. 24, 2015, pp. 1-15.
Translation of response dated Mar. 3, 2022 to Office Action dated Dec. 9, 2021 for Colombian Application No. NC2019/0007374, filed Sep. 14, 2017, pp. 1-14.
Office Action dated May 10, 2022 for Argentinian Application No. 20180100953, filed Apr. 16, 2018, pp. 1-4 (with machine translation).
Office Action dated Jun. 13, 2022 for Colombian Application No. NC2019/0007374, filed Sep. 14, 2017, pp. 1-10 (with machine translation).
Response dated Jul. 18, 2022 to Examination Report dated Apr. 22, 2022 for Australian Patent Application No. 2017417951, filed Sep. 14, 2017, pp. 1-28.
Response dated Aug. 4, 2022 to Office Action dated May 10, 2022 for Argentinian Application No. 20180100953, filed Apr. 16, 2018, pp. 1-44 (with machine translation).
Translation of Office Action dated May 10, 2022 for Argentinian Application No. 20180100953, filed Apr. 16, 2018, pp. 1-4.
Translation of Office Action dated Jun. 13, 2022 for Colombian Application No. NC2019/0007374, filed Sep. 14, 2017, pp. 1-10.
Translation of Response dated Aug. 4, 2022 to Office Action dated May 10, 2022 for Argentinian Application No. 20180100953, filed Apr. 16, 2018, pp. 1-44.
Examination Report dated Apr. 22, 2022 for Australian Patent Application No. 2017417951, filed Sep. 14, 2017, p. 1-4.
Hearing Notice dated Feb. 10, 2022 for Indian Patent Application No. 201727022298, filed Dec. 24, 2015, pp. 1-2.
Response dated Mar. 7, 2022 to Office Action dated Dec. 2, 2021 for Brazilian Application No. 112019016896-6, filed Sep. 14, 2017, pp. 1-22.
Response dated Mar. 8, 2022 to Office Action dated Dec. 13, 2021 for Japanese Application No. 2019-552860, filed Sep. 14, 2017, pp. 1-3 (with machine translation).
Response dated Mar. 24, 2022 to Office Action dated Dec. 9, 2021 for Mexican Application No. MX/a/2017/007061, filed Jun. 5, 2017, pp. 1-7 (with machine translation).
Response dated Apr. 8, 2022 to Hearing Notice dated Feb. 10, 2022 for Indian Patent Application No. 201727022298, filed Dec. 24, 2015, pp. 1-27.
Translation of Response dated Mar. 8, 2022 to Office Action dated Dec. 13, 2021 for Japanese Application No. 2019-552860, filed Sep. 14, 2017, pp. 1-3.
Translation of response dated Mar. 24, 2022 to Office Action dated Dec. 9, 2021 for Mexican Application No. MX/a/2017/007061, filed Jun. 5, 2017, pp. 1-7.
Non-Final Office Action dated Oct. 28, 2021 for U.S. Appl. No. 15/538,962, filed Jun. 22, 2017, pp. 1-9.
Office Action dated Oct. 28, 2021 for Mexican Application No. MX/a/2017/008385, filed Dec. 24, 2015, pp. 1-6.
Office Action dated Dec. 2, 2021 for Brazilian Application No. 112019016896-6, filed Sep. 14, 2017, pp. 1-4.
Office Action dated Dec. 9, 2021 for Mexican Application No. MX/a/2017/007061, filed Jun. 5, 2017, pp. 1-5.
Office Action dated Dec. 13, 2021 for Japanese Application No. 2019-552860, filed Sep. 14, 2017, pp. 1-3 (with machine translation).
Response dated Oct. 27, 2021 to Office Action dated Apr. 28, 2021 for Indian Application No. 201927028805, filed Sep. 14, 2017, pp. 1-68.
Response dated Oct. 28, 2021 to Office Action dated Apr. 28, 2021 for Indian Application No. 201927028805, filed Sep. 14, 2017, pp. 1-70.
Response dated Jan. 17, 2022 to Office Action dated Jul. 27, 2021 for Chilean Application No. 2165-2019, filed Sep. 14, 2017, pp. 1-37 (with translation).
Response dated Jan. 20, 2022 to Non-Final Office Action dated Oct. 28, 2021 for U.S. Appl. No. 15/538,962, filed Jun. 22, 2017, pp. 1-12.
Translation of Office Action dated Dec. 13, 2021 for Japanese Application No. 2019-552860, filed Sep. 14, 2017, pp. 1-2.

(56) References Cited

OTHER PUBLICATIONS

Translation of response dated Jan. 17, 2022 to Office Action dated Jul. 27, 2021 for Chilean Application No. 2165-2019, filed Sep. 14, 2017, pp. 1-11.
Office Action dated Jul. 27, 2021 for Chilean Application No. 2165-2019, filed Sep. 14, 2017, pp. 1-15.
Response dated Jun. 16, 2021 to Office Action dated Mar. 24, 2021 for Colombian Application No. NC2019/0007374, filed Sep. 14, 2017, pp. 1-12 (with translation).
Response dated Aug. 20, 2021 to Office Action dated Mar. 12, 2021 for Japanese Application No. 2019-552860, filed Sep. 14, 2017, pp. 1-9 (with translation).
Translation of response dated Jun. 16, 2021 to Office Action dated Mar. 24, 2021 for Colombian Application No. NC2019/0007374, filed Sep. 14, 2017, pp. 1-7.
Translation of response dated Aug. 20, 2021 to Office Action dated Mar. 12, 2021 for Japanese Application No. 2019-552860, filed Sep. 14, 2017, pp. 1-7.
Advisory Action dated Feb. 22, 2021 for U.S. Appl. No. 15/538,962, filed Jun. 22, 2017, pp. 1-3.
EPO Communication dated Apr. 7, 2021 for European Application No. 17912658.6, filed Sep. 14, 2017, pp. 1-2.
Non-Final Office Action dated Mar. 31, 2021 for U.S. Appl. No. 15/538,962, filed Jun. 22, 2017, pp. 1-6.
Office Action dated Jan. 27, 2021 for Chilean Application No. 2165-2019, filed Sep. 14, 2017, pp. 1-16.
Office Action dated Mar. 12, 2021 for Japanese Application No. 2019-552860, filed Sep. 14, 2017, pp. 1-3 (with machine translation).
Office Action dated Mar. 24, 2021 for Colombian Application No. NC2019/0007374, filed Sep. 14, 2017, pp. 1-9.
Response dated Feb. 16, 2021 to Final Office Action dated Oct. 16, 2020 for U.S. Appl. No. 15/538,962, filed Jun. 22, 2017, pp. 1-13.
Response dated Apr. 26, 2021 to Office Action dated Jan. 27, 2021 for Chilean Application No. 2165-2019, filed Sep. 14, 2017, pp. 1-14 (with translation).
Response dated May 5, 2021 to EPO Communication dated Apr. 7, 2021 for European Application No. 17912658.6, filed Sep. 14, 2017, pp. 1-10.
Translation of Office Action dated Mar. 12, 2021 for Japanese Application No. 2019-552860, filed Sep. 14, 2017, pp. 1-3.
Translation of response dated Apr. 26, 2021 to Office Action dated Jan. 27, 2021 for Chilean Application No. 2165-2019, filed Sep. 14, 2017, pp. 1-5.
Office Action dated Apr. 28, 2021 for Indian Application No. 201927028805, filed Sep. 14, 2017, pp. 1-7.
Response dated Oct. 8, 2021 to Non-Final Office Action dated Mar. 31, 2021 for U.S. Appl. No. 15/538,962, filed Jun. 22, 2017, pp. 1-12.
EPO Communication dated Jun. 8, 2018 for European Application No. 15873824.5, filed Dec. 24, 2015, requiring a response to the Written Opinion issued for the parent PCT application.
Examination Report dated Mar. 29, 2019 for Australian Patent Application No. 2015371280, filed Dec. 24, 2015, pp. 1-4.
Examination Report dated Aug. 13, 2019 for Australian Patent Application No. 2015371280, filed Dec. 24, 2015, pp. 1-2.
Extended European Search Report dated May 22, 2018 for European Patent Application No. 15873824.5, filed Dec. 24, 2015, pp. 1-9.
Extended European Search Report dated Jun. 16, 2020 for European Patent Application No. 17912658.6, filed Sep. 14, 2017, pp. 1-9.
Final Office Action dated Oct. 1, 2019 for U.S. Appl. No. 15/538,962, filed Jun. 22, 2017, pp. 1-9.
International Search Report dated May 17, 2016 for Application No. PCT/US2015/00443, filed Dec. 24, 2015, pp. 1-2.
International Search Report dated Jan. 26, 2018 for Application No. PCT/US2017/55566, filed Sep. 14, 2017, pp. 1-3.
Non-Final Office Action dated Apr. 5, 2019 for U.S. Appl. No. 15/538,962, filed Jun. 22, 2017, pp. 1-17.
Non-Final Office Action dated Mar. 18, 2020 for U.S. Appl. No. 15/538,962, filed Jun. 22, 2017, pp. 1-9.
Office Action dated Jul. 29, 2019 for Japanese Application No. 2017-534562, filed Dec. 24, 2015 pp. 1-3 (with machine translation).
Office Action dated Nov. 5, 2019 for Brazilian Application No. 11-2017-013819-0, filed Dec. 24, 2015, pp. 1-9.
Office Action dated Dec. 20, 2019 for Chinese Application No. 201580076957.7, file Dec. 24, 2015, pp. 1-6 (with translation).
Office Action dated Dec. 24, 2019 for Indian Patent Application No. 201727022298, filed Dec. 24, 2015, pp. 1-6.
Office Action dated Mar. 16, 2020 for Japanese Application No. 2017-534562, filed Dec. 24, 2015, pp. 1-2 (with machine translation).
Office Action dated Sept. 9, 2020 for Chinese Application No. 201580076957.7, filed Dec. 24, 2015, pp. 1-5 (with translation).
Rajeev Bhat et al; "Exploring the Nutritional Potential of Wild and Underutilized Legumes", Comprehensive Reviews in Food Science and Food Safety, vol. 8, No. 4, Oct. 1, 2009, pp. 305-331.
Response dated Dec. 13, 2018 to EPO communication dated Jun. 8, 2018 for European Application No. 15873824.5, filed Dec. 24, 2015, pp. 1-15.
Response dated Jul. 31, 2019 to Non-Final Office Action dated Apr. 5, 2019 for U.S. Appl. No. 15/538,962, filed Jun. 22, 2017, pp. 1-16.
Response dated Aug. 8, 2019 to Examination Report dated Mar. 29, 2019 for Australian Patent Application No. 2015371280, filed Dec. 24, 2015, pp. 1-19.
Response dated Oct. 10, 2019 to Examination Report dated Aug. 13, 2019 for Australian Patent Application No. 2015371280, filed Dec. 24, 2015, pp. 1-19.
Response dated Oct. 29, 2019 to Office Action dated Jul. 29, 2019 for Japanese Application No. 2017-534562, filed Dec. 24, 2015, pp. 1-8 (with machine translation).
Response dated Feb. 3, 2020 to Final Office Action dated Oct. 1, 2019 for U.S. Appl. No. 15/538,962, filed Jun. 22, 2017, pp. 1-10.
Response dated Feb. 10, 2020 to Office Action dated Nov. 5, 2019 for Brazilian Application No. 11-2017-013819-0, filed Dec. 24, 2015, pp. 1-23.
Response dated Mar. 24, 2020 to Office Action dated Mar. 16, 2020 for Japanese Application No. 2017-534562, filed Dec. 24, 2015, pp. 1-4 (with machine translation).
Response dated May 6, 2020 to Office Action dated Dec. 20, 2019 for Chinese Application No. 201580076957.7, filed Dec. 24, 2015, pp. 1-4 (with translation).
Response dated Jun. 23, 2020 to Office Action dated Dec. 24, 2019 for Indian Patent Application No. 201727022298, filed Dec. 24, 2015, pp. 1-196.
Response dated Sep. 18, 2020 to Non-Final Office Action dated Mar. 18, 2020 for U.S. Appl. No. 15/538,962, filed Jun. 22, 2017, pp. 1-11.
Translation of Office Action dated Jul. 29, 2019 for Japanese Application No. 2017-534562, filed Dec. 24, 2015, pp. 1-3.
Translation of response dated Oct. 29, 2019 to Office Action dated Jul. 29, 2019 for Japanese Application No. 2017-534562, filed Dec. 24, 2015, pp. 1-9.
Translation of Office Action dated Dec. 20, 2019 for Chinese Application No. 201580076957.7, filed Dec. 24, 2015, pp. 1-7.
Translation of Office Action dated Mar. 16, 2020 for Japanese Application No. 2017-534562, filed Dec. 24, 2015, pp. 1-2.
Translation of response dated Mar. 24, 2020 to Office Action dated Mar. 16, 2020 for Japanese Application No. 2017-534562, filed Dec. 24, 2005, pp. 1-5.
Translation of Office Action dated Sep. 9, 2020 for Chinese Application No. 201580076957.7, filed Dec. 24, 2005, pp. 1-8.
Written Opinion dated May 17, 2016 for Application No. PCT/US2015/00443, filed Dec. 24, 2015, pp. 1-4.
Written Opinion dated Jan. 26, 2018 for Application No. PCT/US2017/55566, filed Sep. 14, 2017, pp. 1-8.
Final Office Action dated Oct. 16, 2020 for U.S. Appl. No. 15/538,962, filed Jun. 22, 2017, pp. 1-10.
Response dated Nov. 24, 2020 to Office Action dated Sep. 9, 2020 for Chinese Application No. 201580076957.7, filed Dec. 24, 2015, pp. 1-4.

(56) References Cited

OTHER PUBLICATIONS

Response dated Jan. 13, 2021 to EPO communication dated Jun. 16, 2020 for European Patent Application No. 17912658.6, filed Sep. 14, 2017, pp. 1-26.
Office Action dated Sep. 15, 2022 for Chinese Application No. 201780089924.5, filed Sep. 14, 2017, pp. 1-9 (with translation).
Office Action dated Oct. 14, 2022 for Brazilian Application No. 112019016896-6, filed Sep. 14, 2017 pp. 1-11 (with translation).
Response dated Oct. 24, 2022 to Office Action dated dated Jun. 13, 2022 for Colombian Application No. NC2019/0007374, filed Sep. 14, 2017, pp. 1-17 (with machine translation).
Translation of Office Action dated Sep. 15, 2022 for Chinese Application No. 201780089924.5, filed Sep. 14, 2017, pp. 1-12.
Translation of Office Action dated Oct. 14, 2022 for Brazilian Application No. 112019016896-6, filed Sep. 14, 2017, pp. 1-5.
Translation of Response dated Oct. 24, 2022 to Office Action dated dated Jun. 13, 2022 for Colombian Application No. NC2019/0007374, filed Sep. 14, 2017, pp. 1-17.
Response dated Jan. 23, 2023 to Office action dated Oct. 14, 2022 for Brazilian Application No. 112019016896-6, filed Sep. 14, 2017, pp. 1-46 (with translation).
Translation of response dated Jan. 23, 2023 to Office action dated Oct. 14, 2022 for Brazilian Application No. 112019016896-6, filed Sep. 14, 2017, pp. 1-46.
Office Action dated Feb. 6, 2023 for Chilean Application No. 2165-2019, pp. 1-2, filed Sep. 14, 2017, (with machine translation).
Office Action dated Feb. 28, 2023 for European Application No. 17912658.6, filed Sep. 14, 2017, pp. 1-8.
"Post Harvest and Agro Processing", Jan. 1, 2005, https://farmer.gov.in/dacdivision/Machinery1/chap6a.pdf, pp. 259-284.
Translation of Office Action dated Feb. 6, 2023 for Chilean Application No. 2165-2019, filed Sep. 14, 2017, pp. 1-2.
Urschel Laboratories, Inc. Comitrol Processor Model 1700. https://www.urschel.com/sites/urschel.com/files/specs-comitrol-processor-model-1700.pdf.
Hearing Notice dated Jul. 25, 2023 for Indian Patent Application 201927028805, filed Sep. 14, 2017, pp. 1-2.
Response dated May 3, 2023 to Office Action dated Feb. 6, 2023 for Chilean Application No. 2165-2019, filed Sep. 14, 2017, pp. 1-5 (with machine translation).
Response dated Jun. 26, 2023 to Office Action dated Feb. 28, 2023 for European Application No. 17912658.6, filed Sep. 14, 2017, pp. 1-25.
Translation of Response dated May 3, 2023 to Office Action dated Feb. 6, 2023 for Chilean Application No. 2165-2019, filed Sep. 14, 2017, pp. 1-5.

\* cited by examiner

PROCESS AND SYSTEM FOR THE MANUFACTURE OF VEGETABLE DOUGH

OBJECT OF THE INVENTION

Present invention refers to a process for the manufacture of vegetable dough, preferably grains, for example corn grains, using water as an ingredient for the dough, singly, in a time lapse ranging between 5 minutes up to 30 minutes.

BACKGROUND

Nixtamalization is the process through which the cooking of corn with water and lime is undertaken, in order to obtain the nixtamal, which after having been ground, will give rise to the dough, which in turn will be used for the manufacture of corn dough products in general. There are many proofs that this process was originated in Mesoamerica (specifically in the Mexican high planes). The word "nixtamal" is originally nahuatl nextli ("lime ashes") and tamalli ("cooked corn dough"); this concoction has many uses, some which have current origins and others which have a historical origin. The corn may be used freshly or may be dried for later use.

The first step in nixtamalization consists in placing the corn dough grains to cook in an alkaline solution at a temperature near the boiling point. After the cooking, the corn is left immersed in the broth for a certain amount of time. The cooking and soaking times for the corn vary depending on the type of corn, the local traditions and the types of foods to be prepared. It can be cooked for a time period of several minutes up to one hour, and can be left soaking from several minutes up to around one day.

During the cooking and the soaking, a series of chemical changes take place in the corn grains, given the components of the cell membrane of the grains, among which amylase and amylopectin are included, which are highly soluble in alkaline solutions, the grains are softened and their pericarps (shells) become loosened. The grain is hydrated and absorbs calcium and potassium (depending on the compounds used) along the entire process. The starches are dissolved and become gelatinized, and some are dispersed in the liquid. Certain chemical products from the germ are freed, which allow the cooked grain become easier to crush. Cooking produces changes to the main protein in the corn, which causes the proteins and nutrients of the endosperm of the nucleus be more assimilable to the human body.

After the cooking, the alkaline broth (known as nejayote), which contains the dissolved shells), the corn starch and other substances, is decanted and disposed of. To know whether the process was successful, the corn grain must be easily peeled between the fingers upon scrubbing. The grains are completely washed in order to clean them from the nejayote remains, which have a disagreeable taste. The pericarp is disposed of and only the grain germ is preserved.

Afterwards the grain is used by itself or is ground for obtaining corn dough. This process has been modernized and currently the grinding takes place mainly through the use of machines or industrial mills, however in rural areas the use of the "metate" persists, which is a manual stone mill.

Nixtamalization is undertaken by hand: by traditional means or in small scale preparations, or mechanically; on a larger scale or in industrial production.

In the processes used in the state of the art, the grinding of the cooked grains is undertaken by means of at least one of friction and knocking, which affects the starch particles which are present in the corn; similarly in light that it is necessary to soak the corn grain in a water with lime solution, water is produced as a wasted product.

Said process belonging to the state of the art have several disadvantages, among which should be highlighted the amount of time it takes for the preparation of the dough, which lies between 12 and 14 hours, the waste of water and other materials, the grain waste etc.

Through use of the process of present invention said existing disadvantages in the state of the art are eliminated.

BRIEF DESCRIPTION OF THE INVENTION

In a preferred embodiment of the invention, the process for the manufacture of vegetable dough comprises the following steps:

Pulverizing the dehydrated raw vegetable using a micro cutter to obtain particles (raw flour) with different granulometries; separate and classify the particles (flour) according to their granulometries; undertake the mixing of classified particles (flour) and water to obtain a mixture; gelatinize the mixture by means of cutting and friction forces in order to produce dough.

The type of raw dehydrated vegetable to be used can be selected from potato, yucca, and grains such as bean, chickpeas, maize, beans, sorghum, wheat, millet and amaranth.

In a preferred embodiment the raw dehydrated corn grain is used.

It should be mentioned that different types of dehydrated corn can be used in instant invention.

In an alternative embodiment, the raw dehydrated vegetable, for example selected from among grains is made to pass through a magnetic trap, where the foreign ferrous bodies which could be transported alongside the grain could be retained; said retention attempts to avoid damage to the micro cutter. As an example of said ferrous bodies, are nails, screws etc.

In an alternative embodiment, several features of the structure of the vegetable can be eliminated as a function of their usefulness to what the vegetable dough is destined for, for example, the final product which will be manufactured from said dough. As will be obvious to one skilled in the art, the vegetable dough may have a wide variety of uses, among which for example, are the manufacturing of fried stuffs, baked products, cooked products, tortillas, tostadas etc. could be mentioned.

Advantageously, the system and process of instant invention allow for the manipulation of different parameters of the vegetable, such as the particle size, the vegetable structure in order to obtain a vegetable dough which is able to meet the requirements of the final product.

The type of treatment which can be applied to the vegetable will be in function of the type of vegetable and the requirements for the final product:

In the particular case of corn, at least one of the pericarp, the pedicel and the germ (commonly referred to as sub product) are removed from the dehydrated raw corn grain; the removal of said sub product is controlled by the user, who determines the percentage of sub product to be removed within a range of 1% to 100%.

The bean, for its part, may be soaked in water in a first step, to eliminate tastes and toxins and afterwards will be dehydrated.

In the potato, the peel is eliminated and then cut into cubes for its later dehydration.

Optionally, these treatments can be eliminated.

In an alternative embodiment, specifically when dealing with grains, the dehydrated raw grain is precut, using cutting scissors, thus decreasing the size of the raw grain, in such a way that the yield at the time of undertaking the micro cut is increased.

In an alternative embodiment, the grain particles can be classified and stored according to their size.

In an alternative embodiment, the mixing is undertaken based on the weight of the components, in such a way that said components are weighed in an additional step.

In an alternative embodiment, specifically when dealing with grains, specifically when working with corn, the mixing is carried out by adding lime in an amount between 0.3 to 2.5 percent by total weight of the composition, in order to obtain nixtamalized corn dough.

In said alternative embodiment previously described, the cooking and the soaking steps of the corn grain which are present in the known processes of the state of the art are eliminated, thus allowing for decrease in both time and costs of the process. The use of vapor is also not required. Additionally, upon eliminating the soaking of the corn grain step, the use of water is decreased to a significant degree and furthermore, no effluents are generated, which entails important advantages over the known state of the art, as are the elimination of water discharge into the drainage, as well as the costs associated with the processing and said discharge.

In an alternative embodiment, the gelatinizing is undertaken in at least one gelatinization step, preferably from one to four steps, depending on the required dough.

In an alternative embodiment, specifically when dealing with grains, said sub product is classified and pulverized using a micro cutter for generating particles, same which will be stored, which will be included in the final mixture.

Similarly, a device which is specifically conceived for carrying out said method is also described.

DETAILED DESCRIPTION OF THE INVENTION

With the end goal of delimiting the scope of the claimed invention, the following definitions are provided:

The use of the term "approximately" provides a determined additional range. The term is defined in the following manner. The additional range provided by the term is ±10%. By way of example, but not in a limitative manner, if it states "approximately between 25° and 41°", the exact range lies between 22.5° and 45.1°, or yet between 27.5° and 45.1°, or yet between 22.5° and 36.9° or between 27.5° and 36.9°. Any of the possibilities described above are covered through the use of the term "approximately".

In a similar manner, the term "vegetable" should be interpreted as being derived from plants or all elements related to them, in such a way that if speaking of a "vegetable dough" it is to be understood that dough can be maked from a leguminous (for instance garbanzo, broad bean, lentils), a fruit (for instance mango, banana), a tuber (for instance potatoes), a root (for instance carrots), a grain (for instance corn, wheat), a seed (for instance beans, peas, soya), etc.

Figure 1:
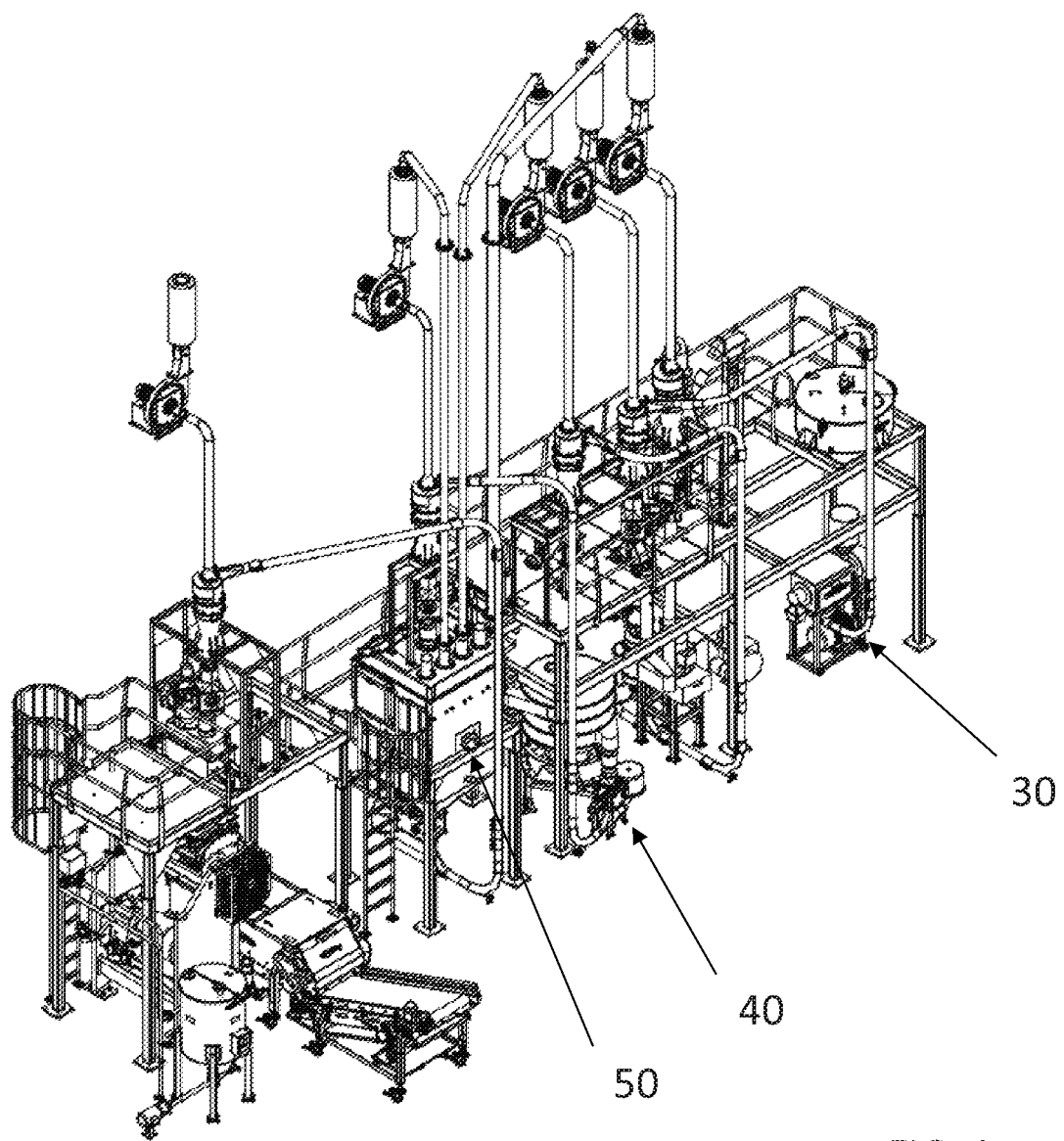
FIG. 1 shows an isometric view of the system of present invention.
Figure 2:
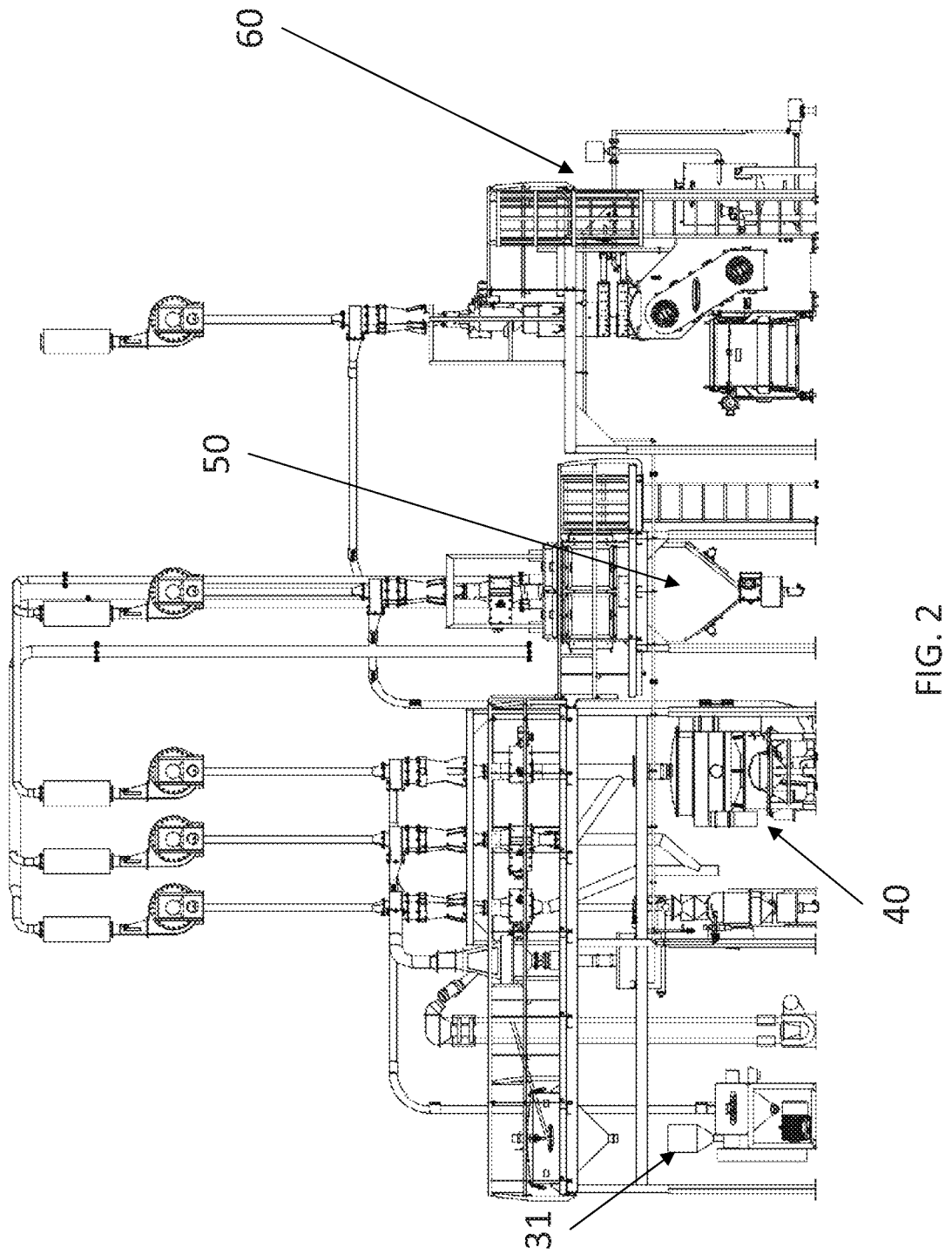
FIG. 2 shows a frontal perspective view of the system of present invention.
Figure 2A:
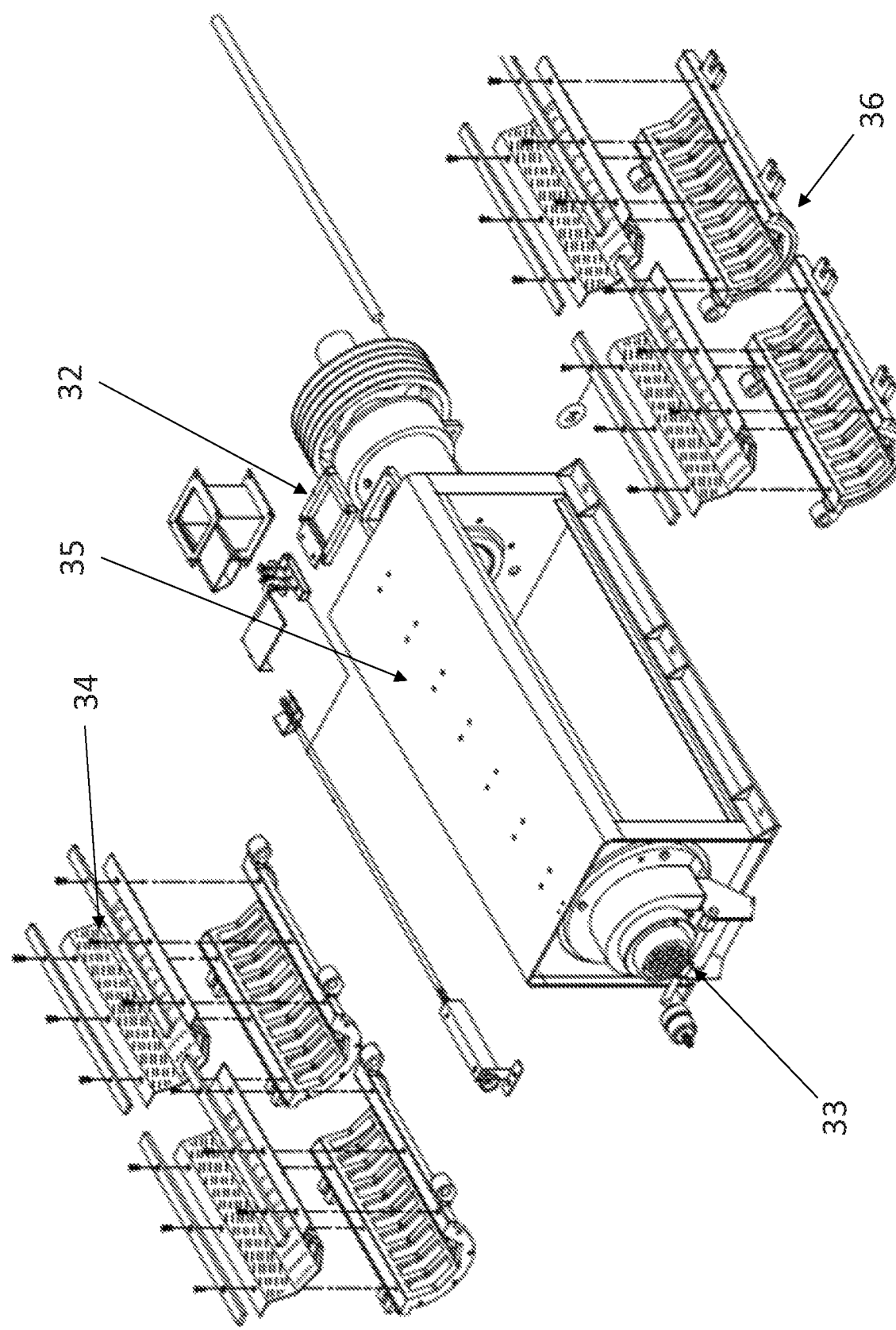
FIG. 2a shows a cut view of the degerminator machine of the system of present invention.
Figure 3:
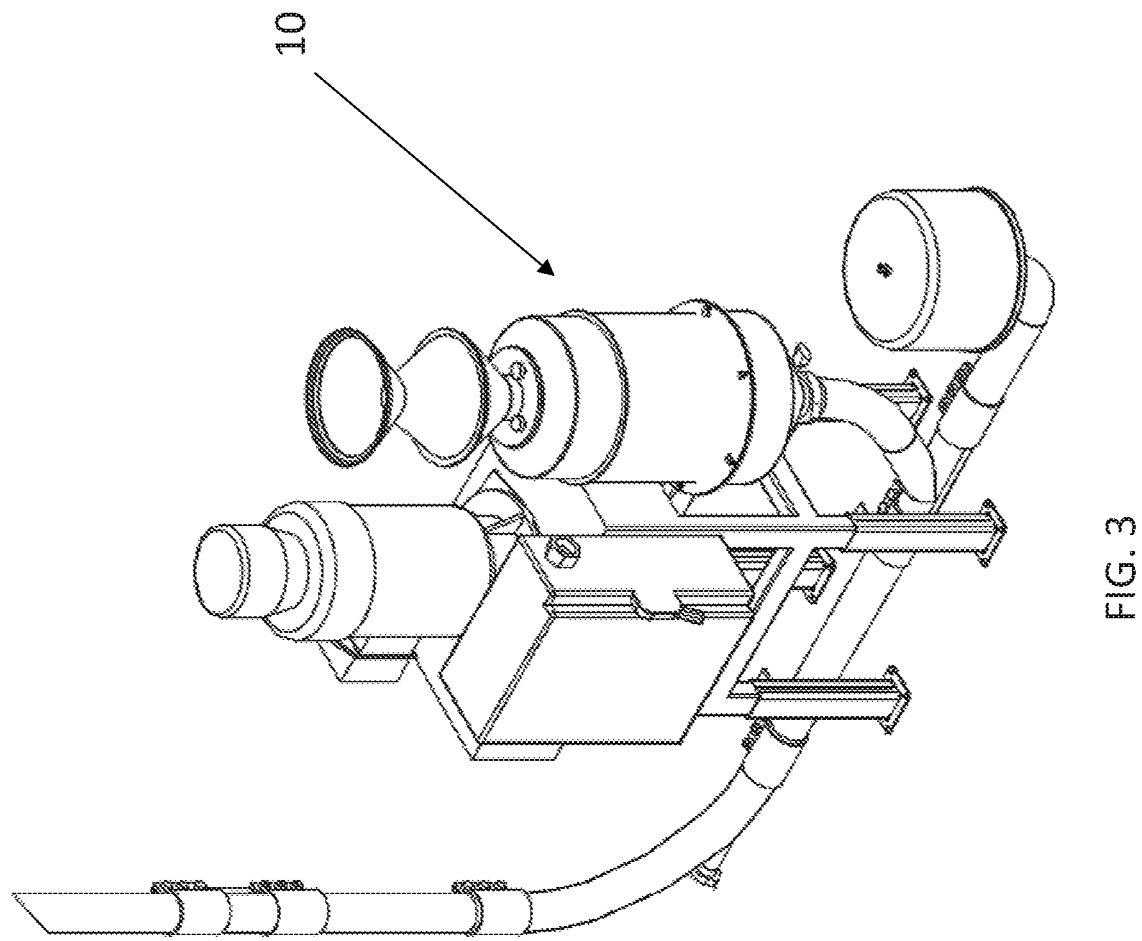
FIG. 3 shows a frontal perspective view of the micro cutter of the system of present invention.
Figure 4:
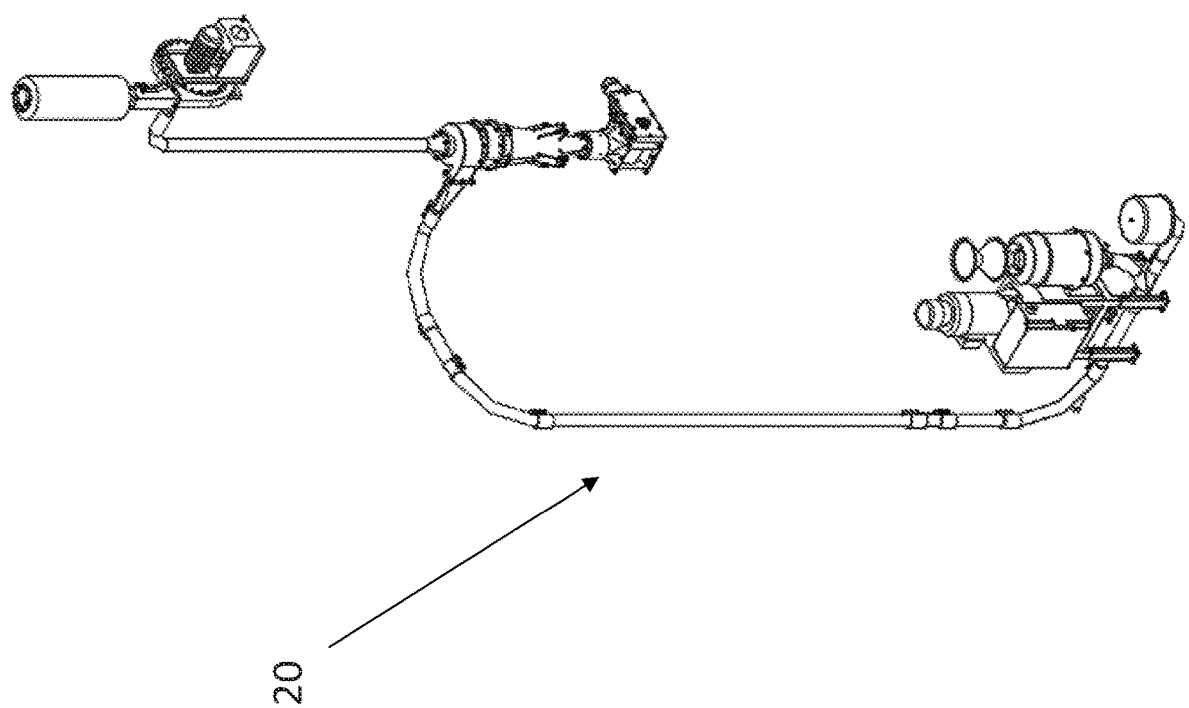
FIG. 4 shows a back perspective view of the micro cutter of the system of present invention.
Figure 5:
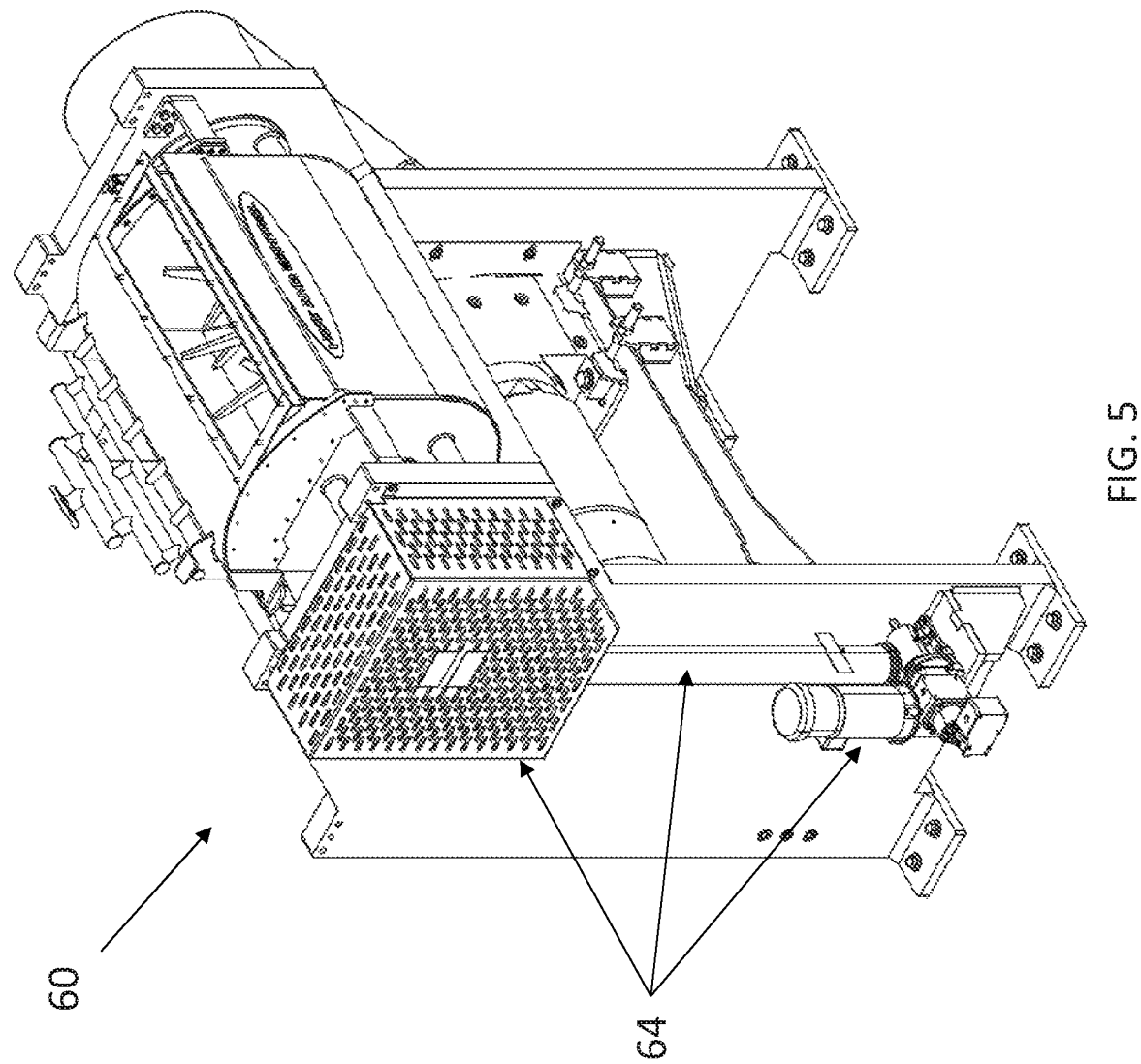
FIG. 5 shows a frontal perspective view of the gelatinizer of the system of present invention.
Figure 6:
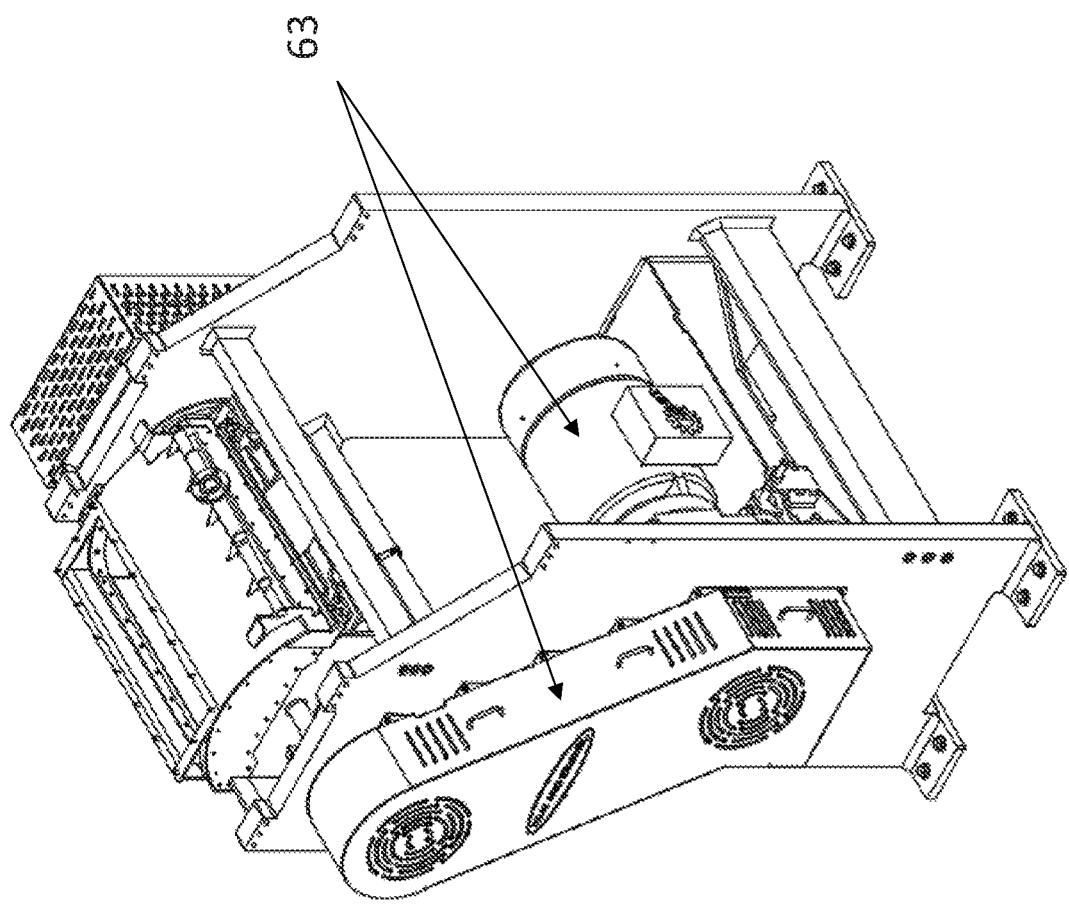
FIG. 6 shows a back perspective view of the gelatinizer of the system of present invention.
Figure 8:
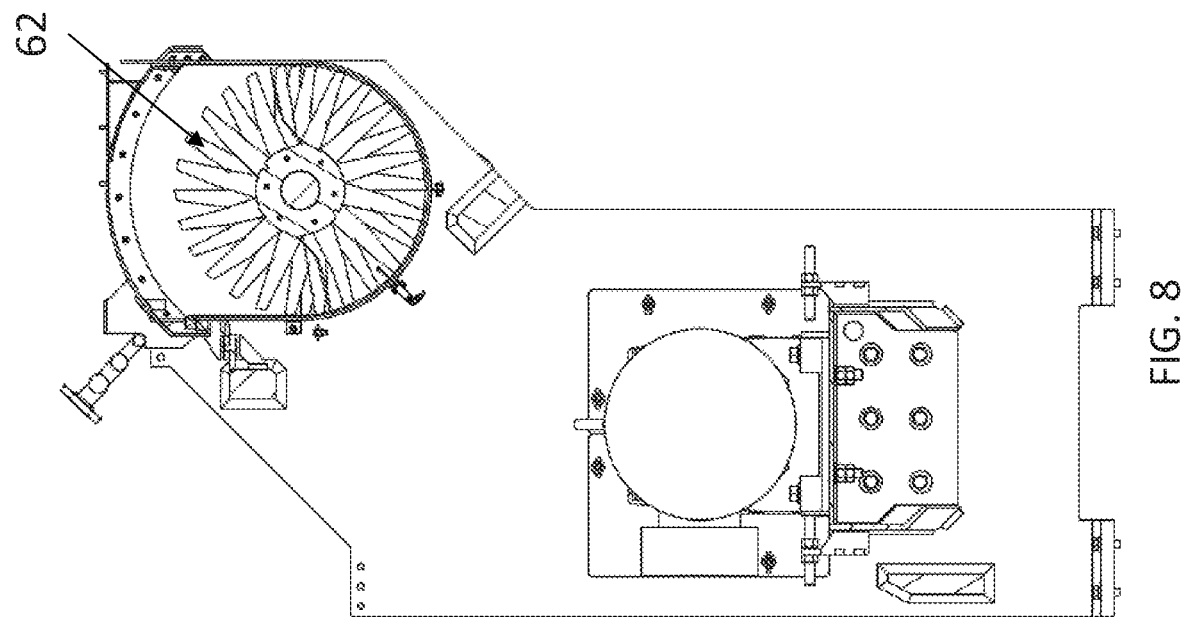
FIG. 8 shows a lateral view of the gelatinizer of the system of present invention.
Figure 7:
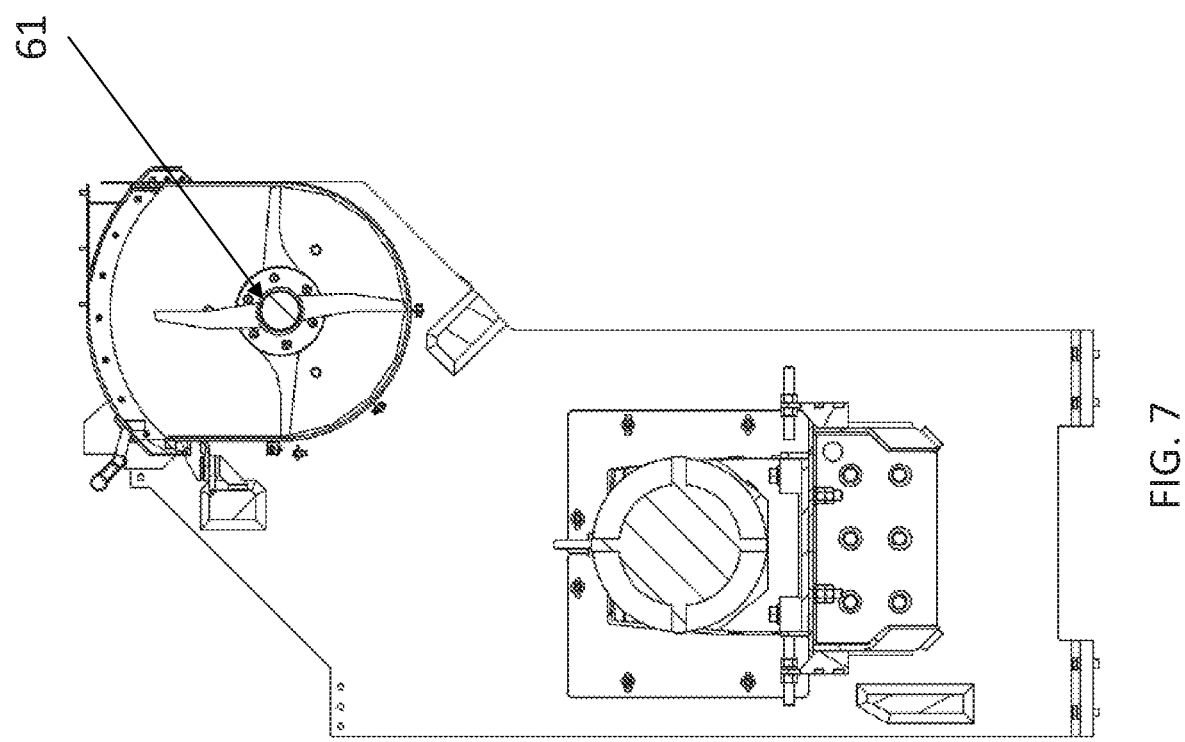
FIG. 7 shows a cross cut of the gelatinizer of the system of present invention, wherein a plurality of blades can be seen.

The manufacturing process for vegetable dough is carried out in a device which is specially conceived for the process of present invention, references FIGS. 1 through 8 in an indistinct manner. For the end purposes of illustrating the system and process of instant invention, corn grains will be used. Notwithstanding, as will become evident to a person skilled in the art, the system and process of the invention can be employed using any type of dehydrated raw vegetable.

The corn grain is pulverized by means of micro cutting to be shrunk to a particle level size (flour) in different granulometries; depending on the desired granulometry different micro cutters will be used with different knife blade numbers, from 50 up to 120 knife blades to achieve an adequate particle size for the final product, in such a way that said particles present a size between 2 mm up to 200 µm, to achieve an adequate size for the granulometry of the particle, it is necessary to feed the corn grain flow to the micro cutting machine (10) by means of a dosage system.

The dosage speed of the corn grain will depend on the variety of corn to be used, given that each corn species presents different properties, such as size, dampness, hardness, amount of starch etc.

The dosage system is carried out with a variable speed worm, which is required in order to be able to adjust the feeding of the micro cutting machine, and also, it must be taken into account that many varieties of corn exist and that each one has different properties.

The corn knocks against the cutting borders of the knife blades which are exposed on a head with great speed. This action results in the elimination of small particles until the decrease of the corn grain is completed. The particles are discharged through the spaces between the knife blades.

Depending on the number of knife blades set on the micro cutting machine (10), will then determine the size of the particles to be obtained, in such a way that by increasing the number of knife blades, the size of the particle will be decreased, while decreasing the number of knife blades will increase the size of the particle.

Given that the driver turns at high speeds, the product remains in the micro cutting machine (10) only for a fraction of a second, thereby avoiding that the corn grains be knocked and become overheated. The particles obtained present the greatest amount of viable starch given the use of the micro cutting, decreasing the corn grains in a soft manner to avoid damage to the starch, thus avoiding the use of hammer mills.

To be able to increase the extraction speed of the particles of the micro cutting machine, a pressure differentiation system (20) is used, being able to use both negative pressure as well as positive pressure, thus avoiding that the particles remain for a longer period of time than necessary in the inner part of the micro cutting machine (10), given that the risk exists that said particles become burnt given the temperature increase in the knife blades caused by the friction with the corn grains to be pulverized.

In an alternative embodiment, prior to the pre cutting step, a step for the separation of the ferrous material is carried out, in such a way that the corn grain passes through a magnetic trap, which traps the ferrous materials in the corn grain, thus avoiding that said materials be introduced into the micro cutting machine, in such a manner that the knife blades of the micro cutting machine are maintained in optimal state.

In an alternative embodiment, the vegetable, preferably grain and even more preferably dehydrated raw grain can have the at least one germ, the pedicel and the pericarp, which jointly are known as the sub product, removed in a controlled manner, thereby obtaining complete or incomplete raw corn, depending on whether one or more of the above parts have been removed.

The raw grain corn is fed to a degerminator machine (30) through a hopper (31), said degerminator machine (30) presents an entry gate (32) and an exit gate (33), through the entry gate the grain is fed by means of a worm to a polishing chamber (35), once the polishing chamber becomes full, the grain is propelled against a rotor and is brushed against some perforated meshes (34) of a screening drum (36), the retention of the grain within the polishing chamber is adjusted to the exit gate by moving two counterweights, causing the sub product to become detached. Said removed sub product is transported, classified and stored for its later use within the process or may be treated as waste. It should be mentioned that said polishing is carried out in a dry manner.

If it is the intention to use the sub product in the flour manufacturing process, said sub product will be transported to a vibratory sorter (40). In a similar manner, said sub product may be processed by a micro cut or any other process.

In an alternative embodiment, said vegetable, preferably grain, even more preferably corn grain is subjected to a precut, in such a way that the size of the grain is decreased, in such a way that the micro cutting process is eased and its efficiency increased.

Said pre cutting machine comprises a plurality of driver flaps which propel the corn grain at a high speed against the plurality of vertical knife blades, thereby obtaining the precut corn grain; the number of knife blades of said precutting machine is much lower than the number of knife blades used in the micro cutting machine, despite them presenting the same functioning principle, the results are different.

Returning to the main embodiment, once the vegetable particles are obtained, these are transported for their separation, wherein they are classified according to their granulometry; in this step, the smallest particles may or may not be separated from the larger sized particles.

Said (flour) particles are transported to the vibratory sorter (40), where they are classified according to their granulometry; the vibratory sorter (40) is a screening device designed to separate the smallest particles from the larger sized particles, and to separate the sub product. The sorter (40) comprises at least one mesh set on a steel frame, the meshes used are from number 10 meshes up to number 100 meshes; the number of meshes will depend on the number of separations wishing to be undertaken.

From the exits, the particles are stored in storage tanks (50), one per each one of the particle granulometries (flour) and one for the sub product.

Each tank has sensors for both high and low levels, the transport system (cyclone and fan), the fluidization system, vibration system and feeding valves.

When the particles reach the low level sensor, the corn grain feeding system is started, when the particles reach the high level sensor, the feeding gate for the corn grain into the micro cutter is closed.

Similarly, two systems are present which aid the particles being transported avoiding clogging, a first system which uses fluidization injecting air into the lower part of the tank and a second system which uses the strategically placed vibrators.

The process will be undertaken in a gelatinizer (50) which comprises in its inner part an arrow (61) with blades (62), temperature sensors, a motor system (63) with a motor reducer, to move the arrow with the blades and a turning system (64). The blades (62) are designed to exercise mechanical work with a cutting and friction force, with flaps which are directed and distributed for gelatinization, wherein the grade of gelatinization will be in function of the final product.

Merely for the purposes of citing one example, a first step comprises undertaking a mixing at a first speed, preferably low speed, between 20 and 30 RPM, to achieve a homogenous mixing of the particles and the water with the objective of obtaining a raw dough, the ratio of particles and water depends on the final product to be manufactured with the dough, preferably the percentage of water varies from approximately 35% to approximately 56%; while a second step comprises undertaking a gelatinizing from the cut and friction force in said raw dough, given that the blades from the equipment turn at a second speed, preferably a high speed, up to 500 RPM, imprinting heat into the dough, causing its gelatinization, both the time as well as the temperature are variables to be controlled within said equipment, the above is based on the type of dough seeking to be obtained, the temperature range is found between approximately 35° C. and up to approximately 60° C.

In an alternative embodiment, the sub product is fed into said gelatinizer, whether it is in particle forms or complete; if the sub product must be fed in particle form, said sub product must be processed by means of using the micro cutting machine.

In an alternative embodiment, lime is added to said mixture to obtain corn dough which is nixtamalized, the percentage of lime used in said mixture varies from approximately 0.3 to approximately 2.5% by weight, which differs very much from the amount of lime used for the conventional nixtamalization processes.

In an alternative embodiment, said stored particles (flour) are weighed to achieve an adequate size combination, in an embodiment, the lime is weighed along with the selected particles, and thus, it consists with a weighing system, wherein the stored particles (flour) are weighed to achieve a combination according to requirements for the final product, which is added into the passage device or directly into the equipment where the mixing and the gelatinization are carried out.

A mechanical device is used for raising and lowering the hopper, the signal for lowering the hopper is determined by the temperature and/or time of the dough, to raise it, it is necessary that the dough has been unloaded. The type of device is chosen from the group of pistons, pulleys, bands etc.

It should be noted that said alternative embodiments may be carried out separately or in combination with the main embodiment.

Alterations to the process described in present application, may be foreseen by those persons skilled in the art. However, it must be understood that present description is described with the preferred embodiments of the invention, which are merely for illustrative purposes and must not be understood as a limitation to the invention. All embodiments which would be considered obvious within the spirit of the invention, such as changes in shape, material and sizes of the features which make up the invention, shall be considered as lying within the scope of the attached claims.

The invention claimed is:

1. A process of a manufacturing system for converting a raw vegetable into vegetable dough comprising:
providing a dry raw vegetable;
micro cutting the dry raw vegetable for a fraction of a second to obtain vegetable particles with different granulometries;
separating and classifying the vegetable particles according to their granulometry to provide classified vegetable particles;
adding water to selected classified vegetable particles to create a mixture; and
subjecting the mixture to friction forces to promote gelatinization and obtain a vegetable dough;
whereby the micro cutting for only a fraction of a second reduces the risk of the dry raw vegetable being overheated.

2. The manufacturing process of claim 1, wherein the vegetable particles are flour.

3. The manufacturing process of claim 1, wherein the micro-cutting step includes micro cutting the dry raw vegetable to obtain vegetable particles with different granulometries ranging in size from 200 microns to 200 millimeters.

4. The manufacturing process of claim 1, wherein the dry raw vegetable is selected from the group consisting of grain, corn grain, corn and whole corn kernels.

5. The manufacturing process of claim 4, further comprising separating at least one sub product selected from the group consisting of the pericarp, the pedicel and the germ from the dry raw vegetable prior to the micro cutting step.

6. The manufacturing process of claim 5, wherein the step of separating at least one sub product includes dry polishing the dry raw vegetable.

7. The manufacturing process of claim 5, wherein the micro cutting step includes micro cutting the at least one sub product.

8. The manufacturing process of claim 1, further comprising precutting the dry raw vegetable prior to the micro cutting step to reduce the size of the dry raw vegetable.

9. The manufacturing process of claim 1, further comprising separating ferrous metals from the dry raw vegetable prior to the micro-cutting step.

10. The manufacturing process of claim 1, further comprising adding lime to the mixture in a 0.3% to 2.5% by weight ratio.

11. The manufacturing process of claim 1, wherein the total time of the process ranges from 5 to 30 minutes.

12. A manufacturing system for converting a dry raw vegetable into vegetable dough comprising:
a machine configured for micro cutting the dry raw vegetable for a fraction of a second to obtain vegetable particles with different granulometries;
a sorter for separating and classifying the vegetable particles according to their size to obtain classified vegetable particles; and
a gelatinizer for exerting cutting forces on a mixture of selected classified vegetable particles and water to obtain a vegetable dough.

13. The manufacturing system of claim 12, wherein the dry raw vegetable is selected from the group consisting of grain, corn grain, corn and whole corn kernels.

14. The manufacturing system of claim 12, further comprising a magnetic trap prior to the machine for micro cutting for separating ferrous materials from the dry raw vegetable.

15. The manufacturing system of claim 12, further comprising a degerminating machine prior to the machine for micro cutting for separating at least one sub product selected from the group consisting of the pericarp, the pedicel and the germ from the dry raw vegetable.

16. The manufacturing system of claim 12, further comprising a plurality of storage tanks for respectively storing classified vegetable particles from the sorter according to their size.

17. The manufacturing system of claim 12, further comprising a precutting machine prior to the machine for micro cutting for reducing the size of the dry raw vegetable.

18. The manufacturing system of claim 12, further comprising a pressure differentiation system utilizing both negative and positive pressure for extracting the vegetable particles from the machine for micro cutting.

19. The manufacturing system of claim 12, further comprising a weighing system prior to the gelatinizer for weighing the different sizes of classified vegetable particles in order to achieve an adequate size combination and water.

20. A process of a manufacturing system for converting a raw vegetable into vegetable dough comprising:
providing a dry raw vegetable;
micro cutting the dry raw vegetable for a fraction of a second to obtain vegetable particles;
adding water to the vegetable particles to create a mixture; and
subjecting the mixture to friction forces to promote gelatinization and obtain a vegetable dough;
whereby the micro cutting for only a fraction of a second reduces the risk of the dry raw vegetable being overheated.

21. The manufacturing process of claim 20, wherein the micro-cutting step includes micro cutting the dry raw vegetable to obtain vegetable particles with different granulometries ranging in size from 200 microns to 200 millimeters, further comprising separating and classifying the vegetable particles according to their granulometry.

* * * * *